US012583076B2

(12) United States Patent
Ogata et al.

(10) Patent No.: US 12,583,076 B2
(45) Date of Patent: Mar. 24, 2026

(54) ADHESIVE SHEET AND POLISHING PAD WITH ADHESIVE SHEET

(71) Applicant: SEKISUI CHEMICAL CO., LTD., Osaka (JP)

(72) Inventors: Yudai Ogata, Osaka (JP); Kazuyuki Fukuyama, Shiga (JP); Tatsuya Kogiso, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 736 days.

(21) Appl. No.: 17/799,734

(22) PCT Filed: Feb. 16, 2021

(86) PCT No.: PCT/JP2021/005652
§ 371 (c)(1),
(2) Date: Aug. 15, 2022

(87) PCT Pub. No.: WO2021/166891
PCT Pub. Date: Aug. 26, 2021

(65) Prior Publication Data
US 2023/0073854 A1      Mar. 9, 2023

(30) Foreign Application Priority Data
Feb. 21, 2020      (JP) .................................. 2020-028456

(51) Int. Cl.
*B24B 37/22*        (2012.01)
*C09J 7/10*         (2018.01)
(Continued)

(52) U.S. Cl.
CPC ................. *B24B 37/22* (2013.01); *C09J 7/10* (2018.01); *C09J 7/387* (2018.01); *C09J 11/08* (2013.01);
(Continued)

(58) Field of Classification Search
CPC .......... B24B 37/22; B24B 37/24; C09J 7/387; C09J 7/00; C09J 7/30; C09J 7/10; C09J 11/08
See application file for complete search history.

(56) References Cited

FOREIGN PATENT DOCUMENTS

| | | |
|---|---|---|
| CN | 103965818 | 8/2014 |
| CN | 104449441 | 3/2015 |

(Continued)

OTHER PUBLICATIONS

International Search Report issued May 18, 2021 in International (PCT) Application No. PCT/JP2021/005652.

*Primary Examiner* — Pegah Parvini
(74) *Attorney, Agent, or Firm* — Wenderoth, Lind & Ponack, L.L.P.

(57)      ABSTRACT
The present invention aims to provide an adhesive sheet excellent in both shear strength and slurry resistance at high temperature and excellent in removability that enables removal without adhesive residue. The present invention also aims to provide a polishing pad with an adhesive sheet including the adhesive sheet. Provided is an adhesive sheet including at least one adhesive layer, the adhesive layer containing a base polymer, a tackifier resin (T1) having a hydroxy value of less than 20 mgKOH/g, and a tackifier resin (T2) having a hydroxy value of 20 mgKOH/g or more and 120 mgKOH/g or less, the base polymer being a block copolymer of a monovinyl-substituted aromatic compound and a conjugated diene compound, and the adhesive layer containing the tackifier resin (T1) in an amount of 10 parts by weight or more and 60 parts by weight or less relative to 100 parts by weight of the base polymer, and the tackifier resin (T2) in an amount of 1 part by weight or more and 40 parts by weight or less relative to 100 parts by weight of the base polymer.

11 Claims, 1 Drawing Sheet

(51) Int. Cl.
   *C09J 7/38*             (2018.01)
   *C09J 11/08*          (2006.01)

(52) U.S. Cl.
   CPC .... *C09J 2301/208* (2020.08); *C09J 2301/408* (2020.08); *C09J 2301/414* (2020.08); *C09J 2425/00* (2013.01); *C09J 2453/00* (2013.01); *C09J 2461/00* (2013.01); *C09J 2493/00* (2013.01)

(56)                References Cited

FOREIGN PATENT DOCUMENTS

| | | | |
|---|---|---|---|
| EP | 6-145611 | 5/1994 | |
| EP | 3 345 979 | 7/2018 | |
| JP | 6-172721 | 6/1994 | |
| JP | 2008-111008 | 5/2008 | |
| JP | 2013-216853 | 10/2013 | |
| JP | 2015-28130 | 2/2015 | |
| JP | 2015-78348 | * 4/2015 | ............... C09J 7/02 |
| JP | 2018-65982 | 4/2018 | |
| JP | 2018-70858 | 5/2018 | |
| WO | 2017/038307 | 3/2017 | |

* cited by examiner

ADHESIVE SHEET AND POLISHING PAD WITH ADHESIVE SHEET

TECHNICAL FIELD

The present invention relates to an adhesive sheet. The present invention also relates to a polishing pad with an adhesive sheet including the adhesive sheet.

BACKGROUND ART

In a process of polishing a semiconductor wafer, a glass substrate for a LCD, or the like to a predetermined thickness (for example, a chemical-mechanical-polishing (CMP) process), polishing is performed using a polishing cloth fixed to a surface plate of a polishing machine. In order to fix the polishing cloth to the surface plate of the polishing machine, a double-sided adhesive sheet is usually used. The double-sided adhesive sheet for fixing a polishing cloth is required to have sufficient adhesion to such an extent that the polishing cloth is not peeled off during polishing, and to be removable from the surface plate without adhesive residue when the used polishing cloth is replaced.

As the double-sided adhesive sheet for fixing an polishing cloth, for example, Patent Literatures 1 and 2 each disclose a double-sided adhesive tape for fixing an abrasive material in which a specific heat-activated adhesive is provided on one side of a plastic film support, a removable adhesive layer is provided on the other side of the plastic film support, and the heat-activated adhesive layer serves as a face to be bonded to an abrasive material.

CITATION LIST

Patent Literature

Patent Literature 1: JP H06-145611 A
Patent Literature 2: JP H06-172721 A

SUMMARY OF INVENTION

Technical Problem

The performance required for double-sided adhesive sheets for fixing a polishing cloth has become more and more sophisticated over years. For example, during polishing, the temperature rises due to frictional heat or a strong shear force is applied, so that displacement or peeling of the adhesive layer easily occurs. In particular, since a strongly acidic or strongly alkaline slurry liquid is used during polishing in recent years, the adhesive layer tends to deteriorate due to the influence of the acid or alkali, and displacement or peeling of the adhesive layer tends to occur.

However, when high adhesion is imparted to the adhesive layer by, for example, addition of a tackifier resin or the like in order to prevent displacement or peeling, the adhesion of the adhesive layer is likely to be accelerated, and it becomes difficult to remove the adhesive layer from the surface plate without adhesive residue.

Accordingly, there is a need for a double-sided adhesive sheet for fixing a polishing cloth that achieves at higher levels both resistance to displacement or peeling when exposed to a strong shear force, a strongly acidic or strongly alkaline slurry liquid, or the like at high temperature, and removability that enables removal from a surface plate without adhesive residue.

The present invention aims to provide an adhesive sheet excellent in both shear strength and slurry resistance at high temperature and excellent in removability that enables removal without adhesive residue. The present invention also aims to provide a polishing pad with an adhesive sheet including the adhesive sheet.

Solution to Problem

The present invention relates to an adhesive sheet including at least one adhesive layer, the adhesive layer containing a base polymer, a tackifier resin (T1) having a hydroxy value of lower than 20 mgKOH/g, and a tackifier resin (T2) having a hydroxy value of 20 mgKOH/g or higher and 120 mgKOH/g or lower, the base polymer being a block copolymer of a monovinyl-substituted aromatic compound and a conjugated diene compound, the adhesive layer containing the tackifier resin (T1) in an amount of 10 parts by weight or more and 60 parts by weight or less relative to 100 parts by weight of the base polymer and the tackifier resin (T2) in an amount of 1 part by weight or more and 40 parts by weight or less relative to 100 parts by weight of the base polymer.

Hereinafter, the present invention will be described in detail.

The present inventors have studied an adhesive layer containing a block copolymer of a monovinyl-substituted aromatic compound and a conjugated diene compound as a base polymer for use as an adhesive layer that can serve as a face to be bonded to a surface plate of a polishing machine. The present inventors have further studied a tackifier resin to be added to such an adhesive layer. As a result, the present inventors have found that both the shear strength and slurry resistance at high temperature and removability that enables removal without adhesive residue can be all improved by use of a tackifier resin (T1) satisfying a relatively low hydroxy value within a specific range and a tackifier resin (T2) satisfying a relatively high hydroxy value within a specific range each in a specific amount. Thus, the present invention was completed.

The adhesive sheet of the present invention has at least one adhesive layer.

The adhesive layer contains a base polymer. The base polymer is a block copolymer of a monovinyl-substituted aromatic compound and a conjugated diene compound (hereinafter also simply referred to as "block copolymer").

When the adhesive layer contains the block copolymer, the shear strength of the adhesive layer at high temperature is sufficiently high. In addition, since the block copolymer has relatively low polarity, when the adhesive layer contains the block copolymer, a slurry liquid is less likely to enter the inside of the adhesive layer as compared with the case of containing, for example, an acrylic polymer. As a result, the slurry resistance of the adhesive layer at high temperature is improved. In addition, when the adhesive layer contains the block copolymer, adhesion acceleration of the adhesive layer is suppressed and the removability is improved as compared with the case where the adhesive layer contains, for example, natural rubber.

The monovinyl-substituted aromatic compound is not limited, and examples thereof include styrene, 2-methylstyrene, 3-methylstyrene, 4-methylstyrene, α-methylstyrene, 2,4-dimethylstyrene, 2,4-diisopropylstyrene, 4-t-butylstyrene, 5-t-butyl-2-methylstyrene, vinylethylbenzene, divinylbenzene, trivinylbenzene, divinylnaphthalene, t-butoxystyrene, vinylbenzyldimethylamine, (4-vinylbenzyl) dimethylaminoethyl ether, N,N-dimethylaminoethylstyrene, N,N-dimethylaminomethylstyrene, 2-ethylstyrene, 3-ethyl-styrene, 4-ethylstyrene, 2-t-butylstyrene, 3-t-butylstyrene, 4-t-butylstyrene, vinylxylene, vinylnaphthalene, vinylpyridine, diphenylethylene, and a tertiary amino group-containing diphenylethylene. The tertiary amino group-containing diphenylethylene is not limited, and examples thereof include 1-(4-N,N-dimethylaminophenyl)-1-phenylethylene. These monovinyl-substituted aromatic compounds may be used alone or in combination of two or more thereof.

The conjugated diene compound is not limited, and examples thereof include isoprene, 1,3-butadiene, 2,3-dimethyl-1,3-butadiene, 1,3-pentadiene, 1,3-hexadiene, 1,3-heptadiene, 2-phenyl-1,3-butadiene, 3-methyl-1,3-pentadiene, and 2-chloro-1,3-butadiene. These conjugated diene compounds may be used alone or in combination of two or more thereof.

The block copolymer may be any block copolymer that has rubber elasticity at room temperature and includes a hard segment portion composed of the monovinyl-substituted aromatic compound and a soft segment portion composed of the conjugated diene compound.

The block copolymer includes a hydrogenated product of a block copolymer of the monovinyl-substituted aromatic compound and the conjugated diene compound.

Specific examples of the block copolymer include a styrene-isoprene-styrene (SIS) block copolymer, a styrene-butadiene-styrene (SBS) block copolymer, a styrene-butadiene-butylene-styrene (SBBS) block copolymer, a styrene-ethylene-butylene-styrene (SEBS) block copolymer, a styrene-ethylene-propylene-styrene (SEPS) block copolymer, a hydrogenated styrene-butylene rubber (HSBR), and a styrene-isobutylene-styrene (SIBS) block copolymer. Among them, the SIS block copolymer and the SEBS block copolymer are preferred, and the SIS block copolymer is more preferred, because adhesion acceleration of the adhesive layer is further suppressed and the removability is further improved. The block copolymer is preferably a hydrogenated product because the shear strength of the adhesive layer at high temperature is improved. These block copolymers may be used alone or in combination of two or more thereof.

The block copolymer may contain a diblock copolymer of the hard segment portion and the soft segment portion in addition to a triblock copolymer of the hard segment portion and the soft segment portion.

The amount of the diblock copolymer in the block copolymer is not limited, and the lower limit of the amount is preferably 10% by weight and the upper limit thereof is preferably 40% by weight. When the amount of the diblock copolymer is 10% by weight or more, adhesion acceleration of the adhesive layer is further suppressed, and the removability is further improved. When the amount of the diblock copolymer is 40% by weight or less, the adhesive layer can be prevented from having excessive hardness, and the adhesion of the adhesive layer is sufficient, leading to more sufficiently high shear strength and slurry resistance of the adhesive layer at high temperature. The lower limit of the amount of the diblock copolymer is more preferably 20% by weight, and the upper limit thereof is more preferably 35% by weight.

The amount of the hard segment portion in the block copolymer (also referred to as "styrene content" when the monovinyl-substituted aromatic compound is styrene) is not limited, and the lower limit of the amount is preferably 5% by weight and the upper limit thereof is preferably 25% by weight. When the amount of the hard segment portion is 5% by weight or more, adhesion acceleration of the adhesive layer is further suppressed, and the removability is further improved. When the amount of the hard segment portion is 25% by weight or less, the adhesive layer can be prevented from having excessive hardness, and the adhesion of the adhesive layer is sufficient, leading to more sufficiently high shear strength and slurry resistance of the adhesive layer at high temperature. The lower limit of the amount of the hard segment portion is more preferably 10% by weight, and the upper limit thereof is more preferably 20% by weight.

The weight average molecular weight of the block copolymer is not limited, and the lower limit thereof is preferably 50,000 and the upper limit thereof is preferably 600,000. When the weight average molecular weight is 50,000 or more, the heat resistance of the adhesive layer is increased, and the shear strength at high temperature is further improved. When the weight average molecular weight is 600,000 or less, an excessive decrease in compatibility between the block copolymer and other components can be prevented. The lower limit of the weight average molecular weight is more preferably 100,000, and the upper limit thereof is more preferably 500,000.

The weight-average molecular weight of the block copolymer is a polystyrene equivalent weight average molecular weight measured by gel permeation chromatography (GPC). In the measurement of the weight average molecular weight by GPC, a column such as LF-804 (produced by Showa Denko K.K.) can be used.

The adhesive layer contains a tackifier resin (T1) having a hydroxy value of lower than 20 mgKOH/g and a tackifier resin (T2) having a hydroxy value of 20 mgKOH/g or higher and 120 mgKOH/g or lower.

When the adhesive layer contains tackifier resins, the shear strength of the adhesive layer at high temperature is sufficiently high. When the adhesive layer contains, among tackifier resins, the tackifier resin (T1) having a relatively low hydroxy value within the above range and the tackifier resin (T2) having a relatively high hydroxy value within the above range, the slurry resistance of the adhesive layer at high temperature is improved, adhesion acceleration is suppressed, and the removability is improved. The reason for this is presumed as follows.

In general, when a slurry liquid enters the inside of an adhesive layer at high temperature (at a temperature of about 60° C.), molecules of ionic substances contained in the slurry liquid move to the interface between the adhesive layer and the adherend, and the ionic substances are adsorbed on the surface of the adherend to cause displacement or separation of the adhesive layer.

In the adhesive sheet of the present invention including the adhesive layer containing the tackifier resin (T2) having relatively high polarity, it is considered that molecules of the tackifier resin (T2) move to the interface between the adhesive layer and the adherend at high temperature (at a temperature of about 60° C.) to form a layer containing the tackifier resin in a larger amount at the interface. Presumably, this layer can prevent the ionic substances contained in the slurry liquid from being adsorbed on the surface of the adherend, and the slurry resistance of the adhesive layer at high temperature is improved.

In the case where only the tackifier resin (T2) is used as the tackifier resin, the slurry resistance of the adhesive layer at high temperature is improved but adhesion acceleration is likely to be promoted because the polarity of the layer containing the tackifier resin in a large amount is too high, leading to lower removability. In the adhesive sheet of the present invention, since the adhesive layer contains the tackifier resin (T1) in addition to the tackifier resin (T2), the polarity of the layer containing the tackifier resins in a large amount can be adjusted within an appropriate range. Accordingly, the slurry resistance of the adhesive layer at high temperature is improved, and adhesion acceleration is suppressed, leading to improvement of the removability.

The hydroxy value of the tackifier resin (T1) is not limited as long as it is lower than 20 mgKOH/g, and is preferably lower than 5 mgKOH/g. The lower limit of the hydroxy value of the tackifier resin (T1) is not limited, and may be 0 mgKOH/g.

The hydroxy value of the tackifier resin is the number of milligrams of potassium hydroxide required to neutralize acetic acid bonded to hydroxy groups in acetylation of 1 g of the tackifier resin, and is defined as a value measured in conformity to the potentiometric titration method specified in JIS K 0070:1992.

The softening point of the tackifier resin (T1) is not limited, and the lower limit thereof is preferably 110° C. When the softening point of the tackifier resin (T1) is 110° C. or higher, the heat resistance of the adhesive layer is increased, and the shear strength at high temperature is further improved. The lower limit of the softening point of the tackifier resin (T1) is more preferably 115° C. The upper limit of the softening point of the tackifier resin (T1) is not limited, and the practical upper limit thereof is about 160° C.

The softening point of the tackifier resin is a temperature at which a solid resin begins to soften and deform, and is defined as a value measured based on the softening point test method (ring and ball method) specified in JIS K 5902 and JIS K 2207.

Specific examples of the tackifier resin (T1) include petroleum resins, terpene resins, styrene resins, and hydrides thereof. These tackifier resins (T1) may be used alone or in combination of two or more thereof. Of these, terpene resins are preferred.

Specific examples of the petroleum resins include aliphatic (C5) petroleum resins, aromatic (C9) petroleum resins, C5/C9 copolymer-based petroleum resins, and alicyclic petroleum resins. Specific examples of the terpene resins include an α-pinene polymer, a β-pinene polymer, a dipentene polymer, and a modified terpene resin which is a modified product of any of these polymers. Examples of the modification in the modified terpene resin include phenol modification, styrene modification, hydrogenation modification, and hydrocarbon modification. More specific examples of the modified terpene resin include styrene-modified terpene resins and hydrogenated terpene resins. More specific examples of the styrene resins include a styrene homopolymer, an α-methylstyrene homopolymer, an α-methylstyrene-styrene copolymer, a styrene-aliphatic polymer, an α-methylstyrene-styrene-aliphatic copolymer, and a phenol-modified styrene resin.

The tackifier resin (T1) may include two or more tackifier resins, and in this case, the tackifier resin (T1) preferably contains the styrene resin. When the tackifier resin (T1) contains the styrene resin, the shear strength of the adhesive layer at high temperature is further improved.

The amount of the styrene resin relative to 100 parts by weight of the base polymer in the adhesive layer is not limited, and the lower limit of the amount is preferably 3 parts by weight and the upper limit thereof is preferably 40 parts by weight. The lower limit is more preferably 5 parts by weight and the upper limit is more preferably 30 parts by weight. The lower limit is still more preferably 10 parts by weight and the upper limit is still more preferably 20 parts by weight.

In the adhesive layer, the lower limit of the amount of the tackifier resin (T1) is 10 parts by weight and the upper limit thereof is 60 parts by weight, relative to 100 parts by weight of the base polymer. When the amount of the tackifier resin (T1) is 10 parts by weight or more, adhesion acceleration of the adhesive layer when the tackifier resin (T1) is used in combination with the tackifier resin (T2) is suppressed to improve the removability, and the shear strength at high temperature is sufficiently high. When the amount of the tackifier resin (T1) is 60 parts by weight or less, adhesion acceleration of the adhesive layer is suppressed to improve the removability. The lower limit of the amount of the tackifier resin (T1) is preferably 20 parts by weight and the upper limit thereof is preferably 50 parts by weight. The lower limit is more preferably 30 parts by weight and the upper limit is more preferably 40 parts by weight.

The hydroxy value of the tackifier resin (T2) is not limited as long as it is 20 mgKOH/g or higher and 120 mgKOH/g or lower, and is more preferably 30 mgKOH/g or higher and 80 mgKOH/g or lower. In the case where a tackifier resin (T3) having a hydroxy value higher than 120 mgKOH/g is used in place of the tackifier resin (T2), the slurry resistance of the adhesive layer at high temperature is improved but adhesion acceleration is likely to be promoted, leading to lower removability.

The softening point of the tackifier resin (T2) is not limited, and the lower limit thereof is preferably 120° C. When the softening point of the tackifier resin (T2) is 120° C. or higher, the heat resistance of the adhesive layer is increased, and the shear strength at high temperature is further improved. The lower limit of the softening point of the tackifier resin (T2) is more preferably 140° C. The upper limit of the softening point of the tackifier resin (T2) is not limited, and the practical upper limit thereof is about 180° C.

Specific examples of the tackifier resin (T2) include coumarone resins, terpene phenol resins, rosin resins, and rosin derivative resins. These tackifier resins (T2) may be used alone or in combination of two or more thereof.

The coumarone resin used may be, for example, a resin containing coumarone and indene as monomer components constituting the backbone (main chain) of the resin. Examples of the monomer component capable of constituting the backbone of the resin other than coumarone and indene include styrene, α-methylstyrene, methylindene, and vinyltoluene.

The terpene phenol resins refer to polymers containing a terpene residue and a phenol residue. The concept of the terpene phenol resins includes both a copolymer of a terpene and a phenol compound (terpene-phenol copolymer resin) and a phenol-modified terpene resin obtained by phenol-modifying a homopolymer or copolymer of a terpene (a terpene resin, typically an unmodified terpene resin).

The terpene constituting the terpene phenol resins is not limited, and monoterpenes such as α-pinene, β-pinene, and limonene are preferred. Limonene includes d-form, l-form, and d/l-form (dipentene).

Specific examples of the rosin resins include unmodified rosins (raw rosins) such as gum rosin, wood rosin, and tall oil rosin, and modified rosins obtained by modifying these unmodified rosins. Examples of the modification in the modified rosins include hydrogenation, disproportionation, and polymerization. More specific examples of the modified rosins include hydrogenated rosin, disproportionated rosin, polymerized rosin, and other chemically-modified rosins.

More specific examples of the rosin derivative resins include a rosin ester resin obtained by esterifying the rosin resin with an alcohol, an unsaturated fatty acid-modified rosin resin obtained by modifying the rosin resin with an unsaturated fatty acid, and an unsaturated fatty acid-modified rosin ester resin obtained by modifying the rosin ester resin with an unsaturated fatty acid.

Examples of the rosin derivative resins also include rosin alcohol resins obtained by reducing the carboxy group of the unsaturated fatty acid-modified rosin resin or unsaturated fatty acid-modified rosin ester resin.

Examples of the rosin derivative resins further include metal salts of the rosin resins or rosin derivative resins (particularly, rosin ester resins), and rosin phenol resins. The rosin phenol resins can be obtained by adding phenol to the rosin resins or rosin derivative resins in the presence of an acid catalyst, followed by thermal polymerization.

The tackifier resin (T2) preferably includes two or more tackifier resins. In particular, the tackifier resin (T2) more preferably contains a coumarone resin. The coumarone resin interacts with the hard segment portion in the base polymer and can stabilize physical crosslinking between the hard segment portions. Therefore, when the tackifier resin (T2) contains the coumarone resin, the heat resistance and bulk strength of the adhesive layer are increased, and the shear strength at high temperature is further improved.

The amount of the coumarone resin relative to 100 parts by weight of the base polymer in the adhesive layer is not limited, and the lower limit of the amount is preferably 5 parts by weight and the upper limit thereof is preferably 30 parts by weight. The lower limit is more preferably 10 parts by weight and the upper limit is more preferably 20 parts by weight. The lower limit is still more preferably 12.5 parts by weight and the upper limit is still more preferably 17.5 parts by weight.

The tackifier resin (T2) more preferably contains at least one tackifier resin selected from the group consisting of a terpene phenol resin, a rosin resin, and a rosin-derivative resin (hereinafter also referred to as "terpene phenol resin or the like"). When the tackifier resin (T2) contains the terpene phenol resin or the like, the slurry resistance of the adhesive layer at high temperature is further improved. Among the terpene phenol resins and the like, a terpene phenol resin is more preferred because the slurry resistance of the adhesive layer at high temperature is further improved.

The amount of the terpene phenol resin or the like relative to 100 parts by weight of the base polymer in the adhesive layer is not limited, and the lower limit of the amount is preferably 1 part by weight and the upper limit thereof is preferably 15 parts by weight. The lower limit is more preferably 5 parts by weight and the upper limit is more preferably 10 parts by weight.

The tackifier resin (T2) particularly preferably contains both the coumarone resin and the terpene phenol resin and the like because the shear strength at high temperature and the slurry resistance at high temperature can be improved while maintaining a balance therebetween.

In the adhesive layer, the lower limit of the amount of the tackifier resin (T2) is 1 part by weight and the upper limit thereof is 40 parts by weight, relative to 100 parts by weight of the base polymer. When the amount of the tackifier resin (T2) is 1 part by weight or more, the shear strength of the adhesive layer at high temperature is sufficiently high and the slurry resistance at high temperature is improved. When the amount of the tackifier resin (T2) is 40 parts by weight or less, adhesion acceleration of the adhesive layer is suppressed, and the removability is improved. The lower limit of the amount of the tackifier resin (T2) is preferably 3 parts by weight and the upper limit thereof is preferably 35 parts by weight. The lower limit is more preferably 5 parts by weight and the upper limit is more preferably 30 parts by weight.

In the adhesive layer, the total amount of the tackifier resin (T1) and the tackifier resin (T2) relative to 100 parts by weight of the base polymer is not limited, and the lower limit thereof is preferably 20 parts by weight and the upper limit thereof is preferably 80 parts by weight. When the total amount of the tackifier resin (T1) and the tackifier resin (T2) is 80 parts by weight or less, adhesion acceleration of the adhesive layer is suppressed, and the removability is further improved. The lower limit of the total amount of the tackifier resin (T1) and the tackifier resin (T2) is more preferably 40 parts by weight and the upper limit thereof is more preferably 60 parts by weight.

The adhesive layer may contain a tackifier resin (T3) having a hydroxy value of higher than 120 mgKOH/g.

The amount of the tackifier resin (T3) relative to 100 parts by weight of the base polymer is not limited, and the upper limit thereof is preferably 5 parts by weight. When the amount of the tackifier resin (T3) is 5 parts by weight or less, adhesion acceleration of the adhesive layer is suppressed, and the removability is improved. The upper limit of the amount of the tackifier resin (T3) is more preferably 2.5 parts by weight, still more preferably 0.1 parts by weight.

However, particularly preferably, the adhesive layer does not contain the tackifier resin (T3), that is, the amount of the tackifier resin (T3) is 0 parts by weight.

The adhesive layer may further contain additives such as a filler, an age inhibitor, an antioxidant, and a colorant.

The thickness of the adhesive layer is not limited, and the lower limit is preferably 20 μm and the upper limit is preferably 100 μm. When the thickness of the adhesive layer is within the above range, the adhesion of the adhesive layer is sufficient, and the shear strength and slurry resistance of the adhesive layer at high temperature are more sufficiently high. The lower limit of the thickness of the adhesive layer is more preferably 40 μm and the upper limit thereof is more preferably 85 μm.

The adhesive sheet of the present invention further preferably includes a substrate and the above-described adhesive layer on a first surface of the substrate, and more preferably includes a different adhesive layer on a second surface of the substrate. In such a case, preferably, the above-described adhesive layer serves as a face to be bonded to a surface plate of a polishing machine, and the different adhesive layer serves as a face to be bonded to a polishing cloth, a polishing material, a polishing pad, or the like.

The substrate is not limited, and is preferably a resin film. The resin film is not limited, and examples thereof include a polyester resin film and a polypropylene resin film. In particular, preferred is a polyester resin film, and more preferred is a polyethylene terephthalate film among polyester resin films, because of its flatness, little variation in thickness, and high strength.

The substrate may contain additives such as a filler, an ultraviolet absorber, a light stabilizer, and an antistatic agent as long as the physical properties of the substrate are not impaired.

The thickness of the substrate is not limited, and the lower limit is preferably 12 μm and the upper limit is preferably 300 μm. When the thickness of the substrate is 12 μm or more, breakage of the substrate upon removal of the adhesive sheet can be prevented, and thus the removability of the adhesive sheet is further improved. When the thickness of the substrate is 300 μm or less, the pressure for pressure-bonding of the adhesive sheet to an adherend can be easily adjusted, and sufficient adhesion can be obtained. The lower limit of the thickness of the substrate is more preferably 20 μm and the upper limit thereof is more preferably 250 μm.

The different adhesive layer may have the same composition, thickness, and the like as those of the above-described adhesive layer, i.e., the adhesive layer serving as a face to be bonded to a surface plate of a polishing machine, or may have a different composition, thickness, and the like.

In the case where the different adhesive layer has a composition different from that of the above-described adhesive layer, the different adhesive layer preferably contains an adhesive used for an ordinary adhesive sheet, such as an acrylic resin adhesive, a rubber adhesive, a silicone adhesive, or a urethane adhesive.

The method for producing the adhesive sheet of the present invention is not limited. For example, in the case where the adhesive sheet includes the substrate and adhesive layers having the same composition and thickness on both surfaces of the substrate, the following method may be used.

First, an adhesive solution containing the block copolymer and the tackifier resin (T1) and the tackifier resin (T2) is prepared. Next, the adhesive solution obtained above is applied to a release-treated surface of a release film, one surface of which has been subjected to release treatment, and dried to produce a laminated sheet including the release film and an adhesive layer on the release-treated surface of the release film. A total of two laminated sheets are prepared in the same manner. Then, the adhesive layers of the two laminated sheets are transferred to a substrate and integrally laminated to obtain an adhesive sheet including the substrate and the adhesive layers on both surfaces of the substrate.

FIG. 1 is a cross-sectional view schematically illustrating an embodiment of the adhesive sheet of the present invention. An adhesive sheet 1 shown in FIG. 1 includes a substrate 2 and an adhesive layer 3a on one surface of the substrate 2. FIG. 2 is a cross-sectional view schematically illustrating another embodiment of the adhesive sheet of the present invention. An adhesive sheet 1 shown in FIG. 2 includes a substrate 2, an adhesive layer 3a on a first surface of the substrate 2, and a different adhesive layer 3b on a second surface of the substrate 2. The adhesive layers 3a and 3b may have the same composition, thicknesses, or the like, or may have different compositions, thicknesses, or the like.

Although the adhesive sheets shown in FIGS. 1 and 2 each include a substrate, the adhesive sheet of the present invention is not limited to such a form and may not include a substrate.

Although the application of the adhesive sheet of the present invention is not limited, it is preferably used for fixing a polishing cloth, a polishing material, a polishing pad, or the like to a surface plate of a polishing machine in a process of polishing a semiconductor wafer, a glass substrate for a LCD, or the like to a predetermined thickness. The reason for this is that the adhesive sheet of the present invention is excellent in shear strength and slurry resistance at high temperature and excellent in removability that enables removal without adhesive residue. Examples of such a polishing process include a chemical-mechanical-polishing (CMP) process.

A polishing pad with an adhesive sheet including the adhesive sheet of the present invention and a polishing pad laminated to the adhesive sheet is also encompassed by the present invention.

The polishing pad may be any polishing pad to be fixed to a surface plate of a polishing machine and made of an absorbent material, a nonwoven fabric, polyurethane, or the like, and examples thereof also include a polishing cloth and a polishing material.

The adhesive sheet of the present invention may have only one layer of the polishing pad or may have multiple layers of the polishing pad.

The polishing pad with an adhesive sheet of the present invention is not limited as long as the adhesive sheet of the present invention and the polishing pad are laminated, and may further include a different adhesive sheet or the like in addition to the adhesive sheet of the present invention and the polishing pad.

FIG. 3 is a cross-sectional view schematically illustrating a state in which the polishing pad with an adhesive sheet of the present invention in one embodiment is bonded to a surface plate. A polishing pad 5 with an adhesive sheet shown in FIG. 3 includes an adhesive sheet 1 and a polishing pad 4 laminated to the adhesive sheet 1, and has the adhesive sheet 1 side surface fixed to a surface plate 6 of a polishing machine. The adhesive sheet 1 includes an adhesive layer 3a on a first surface of the substrate 2 and a different adhesive layer 3b on a second surface of the substrate 2. The adhesive layers 3a and 3b may have the same composition, thicknesses, and the like, or may have different compositions, thicknesses, and the like. At least, the adhesive layer 3b, which serves as a face to be bonded to the surface plate 6, should be the above-described adhesive layer.

Advantageous Effects of Invention

The present invention can provide an adhesive sheet excellent in both shear strength and slurry resistance at high temperature and excellent in removability that enables removal without adhesive residue. The present invention can also provide a polishing pad with an adhesive sheet including the adhesive sheet.

DESCRIPTION OF EMBODIMENTS

Figure 1:
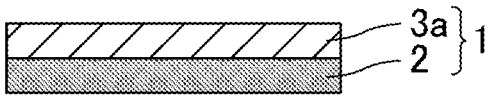
FIG. 1 is a cross-sectional view schematically illustrating one embodiment of the adhesive sheet of the present invention.
Figure 2:
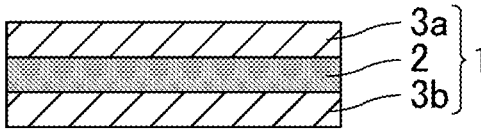
FIG. 2 is a cross-sectional view schematically illustrating another embodiment of the adhesive sheet of the present invention.
Figure 3:
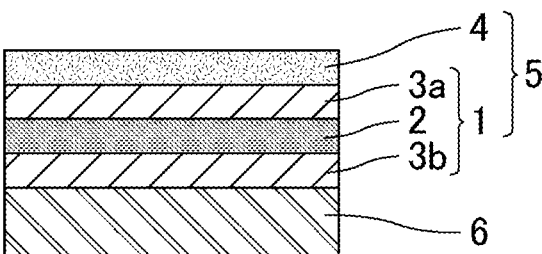
FIG. 3 is a cross-sectional view schematically illustrating a state in which the polishing pad with an adhesive sheet of the present invention in one embodiment is bonded to a surface plate.

Hereinafter, embodiments of the present invention will be described in more detail with reference to, but not limited to, examples.

The block copolymers used were SIS (styrene-isoprene-styrene block copolymer) 1 to 3 available from Zeon Corporation, SEBS (styrene-ethylenebutylene-styrene copolymer) 1 available from JSR Corporation, and natural rubber as shown in Table 1 below. The natural rubber used was Crepe rubber No. 1 available from Toyota Tsusho Corporation.

TABLE 1

| | | Block copolymer | | | | Different base polymer |
|---|---|---|---|---|---|---|
| Type | — | SIS 1 | SIS 2 | SIS 3 | SEBS 1 | Natural rubber |
| Trade name | — | Quintac 3450 | Quintac 3433N | Quintac 3620 | Dynaron 8300 P | — |
| Styrene content | wt % | 19 | 16 | 14 | 9 | 0 |
| Amount of diblock copolymer | wt % | 30 | 56 | 12 | 40 | 0 |

The tackifier resins used were the tackifier resin (T1), the tackifier resin (T2), and the tackifier resin (T3) shown in Table 2 below. The C5 petroleum resin M-100 was available from Arakawa Chemical Industries, Ltd. The terpene resins PX1000 and PX1150 were available from Yasuhara Chemical Co., Ltd. The styrene resin FTR2120 was available from Mitsui Chemicals, Inc. The coumarone resin V-120 was available from Nitto Chemical Co., Ltd. The terpene phenol resins T-130, T-160, S-145, and G-150 were available from Yasuhara Chemical Co., Ltd. The rosin ester resin A-125 was available from Arakawa Chemical Industries, Ltd.

TABLE 2

| | | Tackifier resin (T1) (hydroxy value of lower than 20 mgKOH/g) | | | | | Tackifier resin (T2) (Hydroxy value of 20 to 120 mgKOH/g) | | | | Tackifier resin (T3) (Hydroxy value of higher than 120 mgKOH/g) |
|---|---|---|---|---|---|---|---|---|---|---|---|
| Type | — | C5 petroleum resin | Terpene resin | Terpene resin | Styrene resin | Coumarone resin | Terpene phenol resin | Terpene phenol resin | Terpene phenol resin | Rosin ester resin | Terpene phenol resin |
| Trade name | — | M-100 | PX1000 | PX1150 | FTR2120 | V-120 | T-130 | T-160 | S-145 | A-125 | G-150 |
| Hydroxy value | mgKOH/g | 0 | 0 | 0 | 0 | 30 | 60 | 60 | 120 | 25 | 140 |
| Softening point | ° C. | 100 | 100 | 115 | 125 | 120 | 130 | 160 | 145 | 125 | 150 |

Example 1

As shown in Table 3 below, to 100 parts by weight of the block copolymer were added 10 parts by weight of the tackifier resin (T1) and 15 parts by weight of the tackifier resin (T2), and they were stirred to prepare an adhesive solution. A polyethylene terephthalate film having one surface subjected to release treatment was provided. The adhesive solution obtained above was applied to the release-treated surface of the polyethylene terephthalate film to a dry thickness of 50 μm, and dried at 110° C. for five minutes. Thus, a laminated sheet including the polyethylene terephthalate film and an adhesive layer provided on the release-treated surface of the polyethylene terephthalate film was produced. A total of two laminated sheets were produced in the same manner.

A polyethylene terephthalate film was provided as a substrate. To a first surface of the substrate was laminated one laminated sheet such that the adhesive layer faced the substrate, and the adhesive layer is transferred and integrally laminated to the substrate. To a second surface of the substrate was laminated the other laminated sheet such that the adhesive layer faced the substrate, and the adhesive layer is transferred and integrally laminated to the substrate. Thus, a double-sided adhesive sheet including the substrate and the adhesive layers having a thickness of 50 μm on both surfaces of the substrate was obtained.

Examples 2 to 21 and Comparative Examples 1 to 5

A double-sided adhesive sheet was obtained in the same manner as in Example 1 except that the types and amounts of the block copolymer, the tackifier resin (T1), the tackifier resin (T2), and the tackifier resin (T3) were changed as shown in Table 3 or 4.

<Evaluation>

The double-sided adhesive sheets obtained in the examples and comparative examples were evaluated as follows. Tables 3 and 4 show the results.

(1) Evaluation of Removability

The double-sided adhesive sheet was cut into a size of 25 mm×75 mm, and the release film on one side of the sheet was peeled off. The adhesive sheet piece was bonded to a polyethylene terephthalate (PET) film having a thickness of 23 μm to be supported. Thus, a test piece was produced. Under an environment of 23° C., the release film covering the other adhesive face of the test piece was peeled off, and the test piece was pressure-bonded to the surface of a stainless steel (SUS304) plate by reciprocation of a 2-kg roller once. The workpiece was allowed to stand in the same environment for 20 minutes to obtain a test sample before heat treatment. The test sample before heat treatment was left to stand in an atmosphere at 60° C. for seven days to obtain a test sample after heat treatment. The obtained test samples before and after heat treatment were evaluated for adhesive residue and measured for a rate of adhesion acceleration by the following methods.

(Evaluation of Adhesive Residue)

After the double-sided adhesive sheet of the test sample after heat treatment was peeled off, the presence or absence of adhesive residue on the stainless steel plate was observed.

(Measurement of Rate of Adhesion Acceleration)

In an atmosphere at 23° C., the double-sided adhesive sheets of the test samples before and after heat treatment were peeled off in the 180° direction at a rate of 300 ram/min using a tensile tester in conformity with JIS Z 0237. Thus, the 180° peel strength was measured. Based on the 180° peel strengths of the double-sided adhesive sheets before and after heat treatment, the rate of adhesion acceleration of the double-sided adhesive sheet was calculated using the following equation.

Rate of adhesion acceleration (%)={(180° peel strength after heat treatment)/(180° peel strength before heat treatment)−1}×100

The rate of adhesion acceleration was calculated only in the case where there was no adhesive residue in the evaluation of adhesive residue.

A case where there was no adhesive residue in the evaluation of adhesive residue and the rate of adhesion acceleration was less than 5% was rated as ○○ (Excellent). A case where there was no adhesive residue in the evaluation of adhesive residue and the rate of adhesion acceleration was 5% or higher was rated as ○ (Good). A case where there was adhesive residue in the evaluation of adhesive residue was evaluated as x (Poor).

(2) Evaluation of Slurry Resistance

The double-sided adhesive sheet was cut into a size of 25 mm×75 mm, and the release film on one side of the sheet was peeled off. The adhesive sheet piece was bonded to a polyethylene terephthalate (PET) film having a thickness of 23 μm to be supported. Thus, a test piece was produced. Under an environment of 23° C., the release film covering the other adhesive face of the test piece was peeled off, and the test piece was pressure-bonded to a surface of a stainless steel (SUS304) plate by reciprocation of a 2-kg roller once to obtain a test sample before immersion in a chemical solution.

Semi-Sperse 25 (available from Cabot Microelectronics) was diluted with ion-exchanged water at a ratio of 1:1 to prepare an alkaline chemical solution. The test sample before immersion in a chemical solution was immersed in the alkaline chemical solution in an atmosphere at 60° C. for seven days. Then, the test sample was taken out from the alkaline chemical solution, washed with ion-exchanged water, and then dried at 23° C. for one hour to obtain a test sample after immersion in a chemical solution.

The obtained test samples before and after immersion in a chemical solution were subjected to evaluation of peeling after immersion in a chemical solution and measurement of a change rate in 180° peel strength by the following methods.

(Evaluation of Peeling after Immersion in Chemical Solution)

The presence or absence of peeling of the double-sided adhesive sheet from the stainless steel plate in the test samples before and after immersion in a chemical solution was observed. A case where there was no peeling of the double-sided adhesive sheet was indicated as "None". A case where there was only slight peeling of an end portion of the double-sided adhesive sheet was indicated as "End portion". A case where the double-sided adhesive sheet was entirely peeled was indicated as "Entirely peeled".

(Measurement of Change Rate of 180° Peel Strength)

In an atmosphere at 23° C., the double-sided adhesive sheets of the test samples before and after immersion in a chemical solution were peeled off in the 180° direction at a rate of 300 ram/min using a tensile tester in conformity with JIS Z 0237. Thus, the 180° peel strength was measured. The change rate (%) of the 180° peel strength of the adhesive layer before and after immersion in a chemical solution was calculated by the following equation.

Change rate (%)={(180° peel strength after immersion in alkaline chemical solution)/(180° peel strength before immersion in alkaline chemical solution)×1}×100

The change rate of the 180° peel strength was calculated only in the case where the double-sided adhesive sheet was not peeled or only slightly peeled at an end portion in the evaluation of peeling after immersion in chemical solution (cases determined to be "None" or "End portion").

A case where the evaluation of peeling after immersion in a chemical solution was "None" and the change rate of the 180° peel strength was a decrease by less than 20% was evaluated as ○○ (Excellent). A case where the evaluation of peeling after immersion in a chemical solution was "None" and the 180° peel strength decreased by 20% or more and a case where the evaluation of peeling after immersion in a chemical solution was "End portion" were evaluated as ○ (Good). A case where the evaluation of peeling after immersion in a chemical solution was "Entirely peeled" was evaluated as x (Poor).

(3) Measurement of Shear Strength

The double-sided adhesive sheet was cut into a size of 15 mm×15 mm, the release film on one side was peeled off, and the adhesive sheet was pressure-bonded to a stainless steel (SUS304) plate by reciprocation of a 2-kg roller once. Thus, a test piece was prepared. Under an environment of 23° C., the release film covering the other adhesive face of the test piece was peeled off, and the test piece was pressure-bonded to a surface of a stainless steel (SUS304) plate at 80° C. and 3 kg/cm$^2$ for ten seconds. Thus, a test sample was obtained. Under an atmosphere of 60° C., the double-sided adhesive sheet of the test sample was peeled off at a rate of 10 mm/min in a direction in which shear stress was applied, and the shear strength was measured.

A case where the shear strength was 160 [N/15×15 mm] or more was evaluated as ○○ (Excellent). A case where the shear strength was less than 160 [N/15×15 mm] and 120 [N/15×15 mm] or more was evaluated as ○ (Good). A case where the shear strength was less than 120 [N/15×15 mm] and 80 [N/15×15 mm] or more was evaluated as Δ (Fair). A case where the shear strength was less than 80 [N/15×15 mm] was evaluated as x (Poor).

TABLE 3

| | | | Example | | | | | | | | | | | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| Ad-hesive layer (parts by weight) | Block co-polymer | SIS 1 | 100 | 100 | 100 | 100 | 100 | 100 | 100 | — | — | — | 100 | 100 | 100 | 100 | — |
| | | SIS 2 | — | — | — | — | — | — | — | 100 | — | — | — | — | — | — | — |
| | | SIS 3 | — | — | — | — | — | — | — | — | 100 | — | — | — | — | — | — |
| | | SEBS 1 | — | — | — | — | — | — | — | — | — | 100 | — | — | — | — | 100 |
| | Different base polymer | Natural rubber | — | — | — | — | — | — | — | — | — | — | — | — | — | — | — |
| | Tackifier resin (T1) (Hydroxy | M-100: C5 Petroleum | 10 | 50 | 60 | 45 | 45 | 45 | 45 | 45 | 45 | 45 | — | — | — | — | — |

TABLE 3-continued

| | | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| | value of lower than 20 mgKOH/g) | resin PX1000: Terpene resin | — | — | — | — | — | — | — | — | — | — | — | — | — | 40 | — |
| | | PX1150: Terpene resin | — | — | — | — | — | — | — | — | — | — | 40 | 40 | 40 | — | 40 |
| | | FTR2120: Styrene resin | — | — | — | — | — | — | 10 | — | — | — | — | — | — | — | — |
| | Tackifier resin (T2) (Hydroxy value of 20 to 120 mgKOH/g) | V-120: Coumarone resin | 15 | 15 | 15 | 5 | 15 | 40 | 5 | 15 | 15 | 15 | — | — | — | — | — |
| | | T-130: Terpene phenol resin | — | — | — | — | — | — | — | — | — | — | — | — | — | — | — |
| | | T-160: Terpene phenol resin | — | — | — | — | — | — | — | — | — | — | 5 | — | — | 5 | — |
| | | S-145: Terpene phenol resin | — | — | — | — | — | — | — | — | — | — | — | 5 | — | — | 5 |
| | | A-125: Rosin ester resin | — | — | — | — | — | — | — | — | — | — | — | — | 5 | — | — |
| | Tackifier resin (T3) (Hydroxy value of higher than 120 mgKOH/g) | G-150: Terpene phenol resin | — | — | — | — | — | — | — | — | — | — | — | — | — | — | — |
| Evaluation | Shear strength | | ○ | ○ | ○ | ○ | ○○ | ○○ | ○○ | Δ | ○ | Δ | ○ | ○ | ○ | Δ | ○ |
| | Slurry resistance | Evaluation | ○ | ○ | ○ | ○ | ○ | ○ | ○ | ○ | ○ | ○○ | ○○ | ○○ | ○○ | ○○ | ○○ |
| | | Peeling after immersion | End portion | End portion | End portion | End portion | End portion | End portion | End portion | End portion | End portion | None | None | None | None | None | None |
| | | Change rate of 180° peel strength (%) | −17.1 | −9.0 | −15.1 | ≧0 | ≧0 | ≧0 | ≧0 | −21.1 | −10.6 | ≧0 | −1.8 | −2.0 | −13.9 | ≧0 | ≧0 |
| | Removability | | ○ | ○○ | ○ | ○○ | ○○ | ○ | ○○ | ○ | ○○ | ○○ | ○○ | ○ | ○○ | ○ | ○○ |

In Example 6 and Example 14, the evaluation result in the evaluation of removability was 0 (no adhesive residue in the evaluation of adhesive residue, and the rate of adhesion acceleration was 5% or more), but the rate of adhesion acceleration exceeded 20%.

TABLE 4

| | | | Example | | | | | | Comparative Example | | | | |
|---|---|---|---|---|---|---|---|---|---|---|---|---|---|
| | | | 16 | 17 | 18 | 19 | 20 | 21 | 1 | 2 | 3 | 4 | 5 |
| Adhesive layer (parts by weight) | Block copolymer | SIS 1 | 100 | 100 | 100 | 100 | 100 | 100 | — | 100 | 100 | 100 | 100 |
| | | SIS 2 | — | — | — | — | — | — | — | — | — | — | — |
| | | SIS 3 | — | — | — | — | — | — | — | — | — | — | — |
| | | SEBS 1 | — | — | — | — | — | — | — | — | — | — | — |
| | Different base polymer | Natural rubber | — | — | — | — | — | — | 100 | — | — | — | — |

TABLE 4-continued

| | | Example | | | | | | Comparative Example | | | | |
|---|---|---|---|---|---|---|---|---|---|---|---|---|
| | | 16 | 17 | 18 | 19 | 20 | 21 | 1 | 2 | 3 | 4 | 5 |
| Tackifier resin (T1) (Hydroxy value of lower than 20 mgKOH/g) | M-100: C5 Petroleum resin | — | — | — | — | — | — | — | — | — | — | — |
| | PX1000: Terpene resin | — | — | — | — | — | — | — | — | — | — | — |
| | PX1150: Terpene resin | 40 | 40 | 40 | 40 | 40 | 40 | 40 | 70 | 40 | 40 | 40 |
| | FTR2120: Styrene resin | — | — | — | — | — | — | — | — | — | — | — |
| Tackifier resin (T2) (Hydroxy value of 20 to 120 mgKOH/g) | V-120: Coumarone resin | 15 | 15 | 30 | 15 | 5 | 5 | — | — | — | 15 | — |
| | T-130: Terpene phenol resin | 5 | — | — | — | — | — | — | — | — | — | — |
| | T-160: Terpene phenol resin | — | 5 | 5 | — | 5 | 5 | 5 | 5 | — | 40 | — |
| | S-145: Terpene phenol resin | — | — | — | 5 | — | — | — | — | — | — | — |
| | A-125: Rosin ester resin | — | — | — | — | — | — | — | — | — | — | — |
| Tackifier resin (T3) (Hydroxy value of higher than 120 mgKOH/g) | G-150: Terpene phenol resin | — | — | — | — | — | 2.5 | — | — | — | — | 5 |
| Evaluation | Shear strength | ○○ | ○○ | ○○ | ○○ | ○ | ○ | Δ | ○ | X | ○○ | ○ |
| | Slurry resistance Evaluation | ○○ | ○○ | ○○ | ○○ | ○○ | ○○ | ○ | ○○ | X | ○○ | ○○ |
| | Peeling after immersion | None | None | None | None | None | None | None | None | Entirely peeled | None | None |
| | Change rate of 180° peel strength (%) | ≥0 | ≥0 | ≥0 | ≥0 | −5.9 | −5.9 | −23.5 | −0.3 | — | ≥0 | ≥0 |
| | Removability | ○○ | ○○ | ○ | ○ | ○○ | ○ | X | X | ○○ | X | X |

INDUSTRIAL APPLICABILITY

The present invention can provide an adhesive sheet excellent in both shear strength and slurry resistance at high temperature and excellent in removability that enables removal without adhesive residue. The present invention can also provide a polishing pad with an adhesive sheet including the adhesive sheet.

REFERENCE SIGNS LIST

1 adhesive sheet
2 substrate
3a, 3b adhesive layer
4 polishing pad
5 Polishing pad with adhesive sheet
6 surface plate (polishing machine)

The invention claimed is:

1. An adhesive sheet comprising at least one adhesive layer,
    the adhesive layer containing a base polymer, a tackifier resin (T1) having a hydroxy value of lower than 20 mgKOH/g, and a tackifier resin (T2) having a hydroxy value of 20 mgKOH/g or higher and 120 mgKOH/g or lower and comprising a coumarone resin and a terpene phenol resin,
    the base polymer being a block copolymer of a monovinyl-substituted aromatic compound and a conjugated diene compound,
    the adhesive layer containing the tackifier resin (T1) in an amount of 10 parts by weight or more and 60 parts by weight or less relative to 100 parts by weight of the base polymer, the tackifier resin (T2) in an amount of 6 parts by weight or more and 40 parts by weight or less relative to 100 parts by weight of the base polymer, the coumarone resin in an amount of 5 parts by weight or more and 30 parts by weight or less relative to 100 parts by weight of the base polymer, and the terpene phenol resin in an amount of 1 part by weight or more and 15 parts by weight or less relative to 100 parts by weight of the base polymer.

2. The adhesive sheet according to claim 1,
    wherein the tackifier resin (T1) has a softening point of 110° C. or higher.

3. The adhesive sheet according to claim 1,
    wherein the tackifier resin (T2) has a softening point of 120° C. or higher.

4. The adhesive sheet according to claim 1,
    wherein the tackifier resin (T2) further contains at least one tackifier resin selected from the group consisting of a rosin resin, and a rosin-derivative resin.

5. The adhesive sheet according to claim 1,
    wherein the tackifier resin (T1) contains a terpene resin.

6. The adhesive sheet according to claim 1,
    wherein the tackifier resin (T1) contains a styrene resin.

7. The adhesive sheet according to claim 1,
    wherein the adhesive layer contains a tackifier resin (T3) having a hydroxy value of higher than 120 mgKOH/g in an amount of 5 parts by weight or less relative to 100 parts by weight of the base polymer.

8. The adhesive sheet according to claim 1, wherein the block copolymer contains a diblock copolymer in an amount of 10% by weight or more and 40% by weight or less.

9. The adhesive sheet according to claim 1, wherein the block copolymer is a hydrogenated product.

10. The adhesive sheet according to claim 1, further comprising a substrate, wherein the adhesive sheet includes the adhesive layer on a first surface of the substrate, and a different adhesive layer on a second surface of the substrate.

11. A polishing pad with an adhesive sheet, comprising: the adhesive sheet according to claim 1; and a polishing pad laminated to the adhesive sheet.

\*   \*   \*   \*   \*